(12) United States Patent
Quanbeck et al.

(10) Patent No.: US 6,511,090 B2
(45) Date of Patent: Jan. 28, 2003

(54) RETRACTABLE HITCH

(76) Inventors: Sherman A. Quanbeck, Mandan, ND (US); Loretta Quanbeck, legal representative, 3312 46th Ave. NE., Mandan, ND (US) 58554

( * ) Notice: Subject to any disclaimer, the term of this patent is extended or adjusted under 35 U.S.C. 154(b) by 0 days.

(21) Appl. No.: 09/877,343

(22) Filed: Jun. 8, 2001

(65) Prior Publication Data

US 2002/0113406 A1 Aug. 22, 2002

Related U.S. Application Data

(60) Provisional application No. 60/270,691, filed on Feb. 22, 2001.

(51) Int. Cl.$^7$ ................................................. B60D 1/16
(52) U.S. Cl. ................................................. 280/491.1
(58) Field of Search ........................... 280/491.1, 491.2, 280/491.5

(56) References Cited

U.S. PATENT DOCUMENTS

| | | | | |
|---|---|---|---|---|
| 2,425,838 A | * | 8/1947 | Schultz | 280/482 |
| 2,474,231 A | | 6/1949 | Crosley | 280/33.44 |
| 2,612,384 A | * | 9/1952 | Wiegman | 280/491.2 |
| 2,624,589 A | * | 1/1953 | Strand | 280/491.2 |
| 2,845,281 A | | 7/1958 | Holder et al. | 280/478 |
| 2,856,204 A | * | 10/1958 | Graham | 280/491.2 |
| 2,916,302 A | * | 12/1959 | Lippitt | 280/491.5 |
| 2,929,643 A | | 3/1960 | Merchant | 280/491 |
| 3,126,210 A | | 3/1964 | Hill | 280/478 |
| 3,279,825 A | | 10/1966 | Boutwell | 280/478 |
| 3,807,768 A | | 4/1974 | Jones | 280/478 B |
| 3,860,267 A | | 1/1975 | Lyons | 280/478 B |
| 4,596,406 A | | 6/1986 | Van Vleet et al. | 280/511 |
| 4,951,957 A | | 8/1990 | Gullickson | 280/479.2 |
| D317,426 S | | 6/1991 | Lytle | D12/162 |
| 5,288,095 A | | 2/1994 | Swindall | 280/479.2 |

* cited by examiner

Primary Examiner—Kevin Hurley
(74) Attorney, Agent, or Firm—Westman, Champlin & Kelly, P.A.

(57) ABSTRACT

A retractable hitch is made to mount onto the rear of a towing vehicle, and lower the hitch ball to a desired level. A housing is attached to the towing vehicle, and has side walls and a bottom wall, the hitch bar is slidably mounted in the housing, and slides between a working position wherein an outer end carrying a hitch ball is extended from the vehicle, and a retracted position wherein the hitch ball is inside the housing. A spring-loaded lever holds the hitch ball in its retracted position, and is releasable to let the hitch bar out to its working position.

12 Claims, 3 Drawing Sheets

RETRACTABLE HITCH

CROSS REFERENCE TO RELATED APPLICATION

This application claims priority on and benefit to U.S. Provisional Application No. 60/270,691, filed Feb. 22, 2001 and entitled "RETRACTABLE HITCH".

BACKGROUND OF THE INVENTION

The present invention relates to a retractable hitch for pulling vehicles which has a slide member that will move between a retracted position, to protect the ball on the hitch, and an extended position wherein the ball is available for connection to a trailer.

Retracting hitch or tongues are known in the prior art, and a retractable hitch shown in U.S. Pat. No. 2,929,643 is typical of this type of device.

A sliding ball hitch for use with automobiles is shown in U.S. Pat. No. 2,474,231. The present invention provides for a retracting hitch that will hold the hitch in its retracted position with a spring-loaded lever that also provides a biasing force to prevent the hitch from rattling and causing annoying sounds.

SUMMARY OF THE INVENTION

The present invention relates to a retracting hitch for use on vehicles, such as pickup trucks and the like, which has a strong frame, and a sliding hitch bar. The hitch bar has a hitch ball at its outer end, and the bar can be slid in and out of position. The bar is retained in a frame work that will provide for adequate load support, and when it is not to be used, the bar can be slid into a retracted position within the frame work and held in place with a spring latch. The latch or lever will engage the ball and provide a spring or biasing load against the ball and the hitch bar to hold it snuggly.

The hitch bar is mounted on the frame that lowers the hitch bar below that of the high bumpers that are used on pickups and other vehicles at the present time. The hitch ball is at the correct level for most trailers that are used. By having the extended hitch bar in a working position, the trailer tongue is not likely to strike the bumper or otherwise be damaged during a tight turn. Having the hitch retract so that it is all within the housing and underneath the bumper eliminates the hazard of the protruding hitch that will reduce damages in minor rear end collisions, and also eliminates the hazard of walking into the hitch. The appearance is greatly improved as well.

The movement in and out of the bar can be used to assist alignments of the hitch, and the hitch bar will be latched in place when it is full to its extended position even as the vehicle is moved forward after the hitch has been placed on the hitch ball.

The unit is rugged, and can be mounted in various ways to fit different vehicles. The use of a spring-loaded retainer insures that the hitch will remain retracted, and also eliminate rattles and the like from clearances on regular parts.

The unit is simple to make, and easily installed.

DETAILED DESCRIPTION OF THE ILLUSTRATIVE EMBODIMENTS

Figure 1:
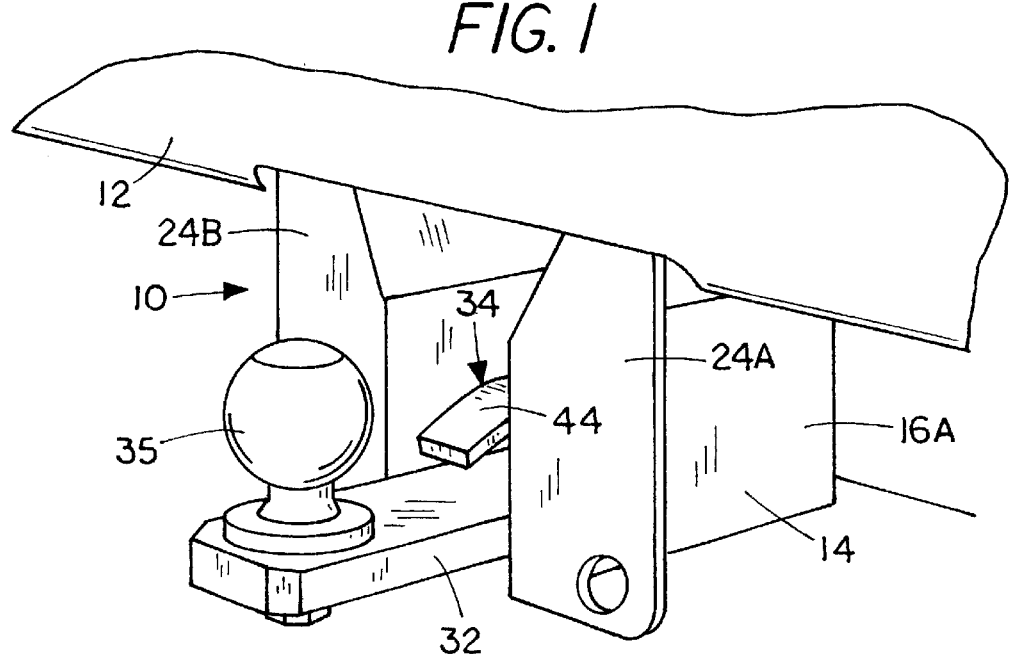
FIG. 1 is a schematic perspective view of the hitch of the present invention in an extended working position.

In FIG. 1, the retractable hitch of the present invention illustrated generally at 10 is shown mounted below the bumper 12 of a vehicle (not shown). The retractable hitch 10 includes a frame assembly 14 that has side plates 16A and 16B (see FIG. 3) that are joined with a bottom plate 18, to form a hitch housing 20. The housing 20 is supported on a cross bar 22, that is suitably supported to the frame of the vehicle. The cross bar can be adjusted in length and size to fit different vehicles. The side plates 16A and 16B have outer flanges 24A and 24B, respectively, which have ears that will be bolted to the bumper. A typical one of the ears is shown at 26 in FIG. 3, with a bolt 28 that secures it to the bumper.

Figure 3:
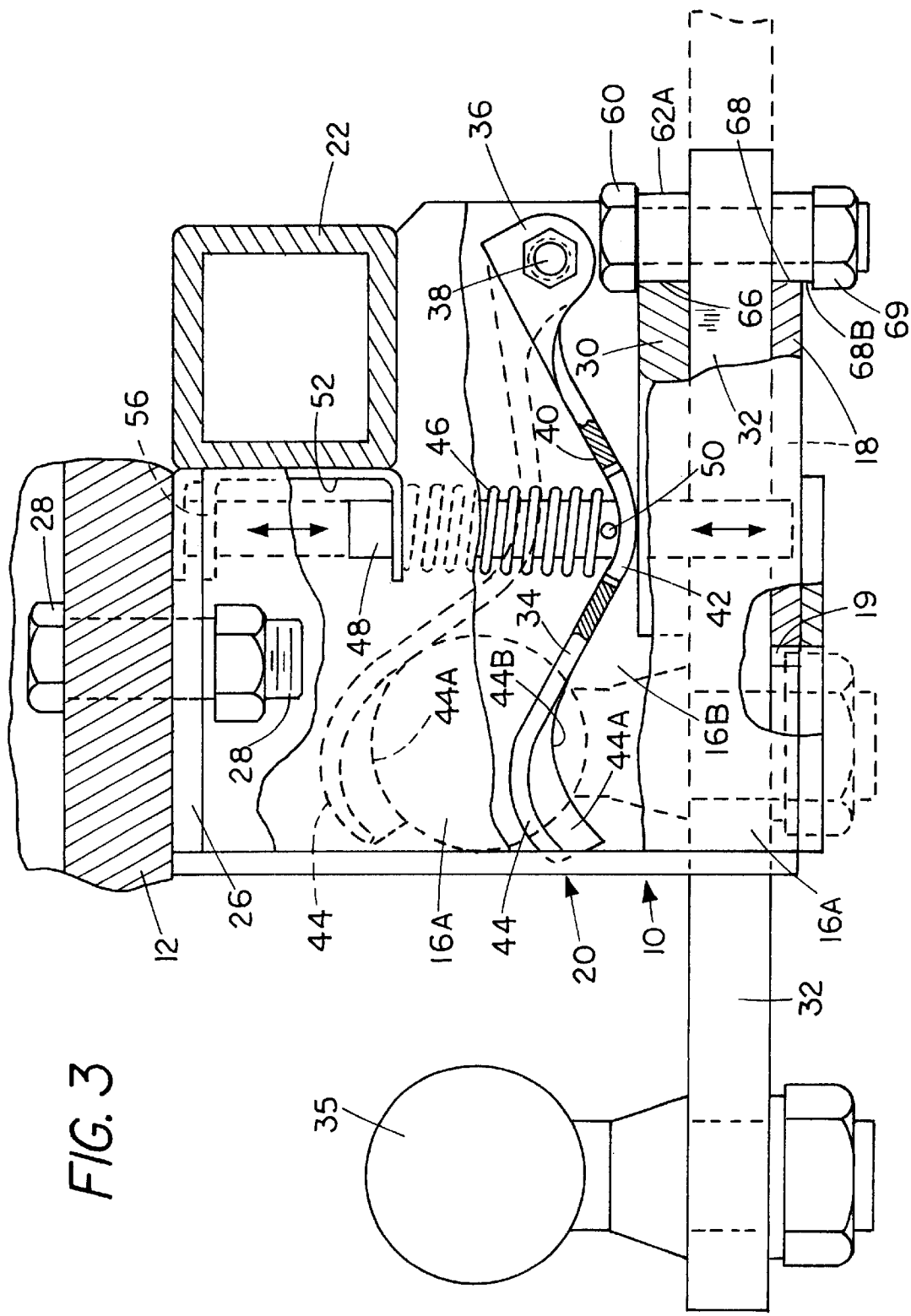
FIG. 3 is a side elevational view with parts in section and parts broken away.
Figure 4:
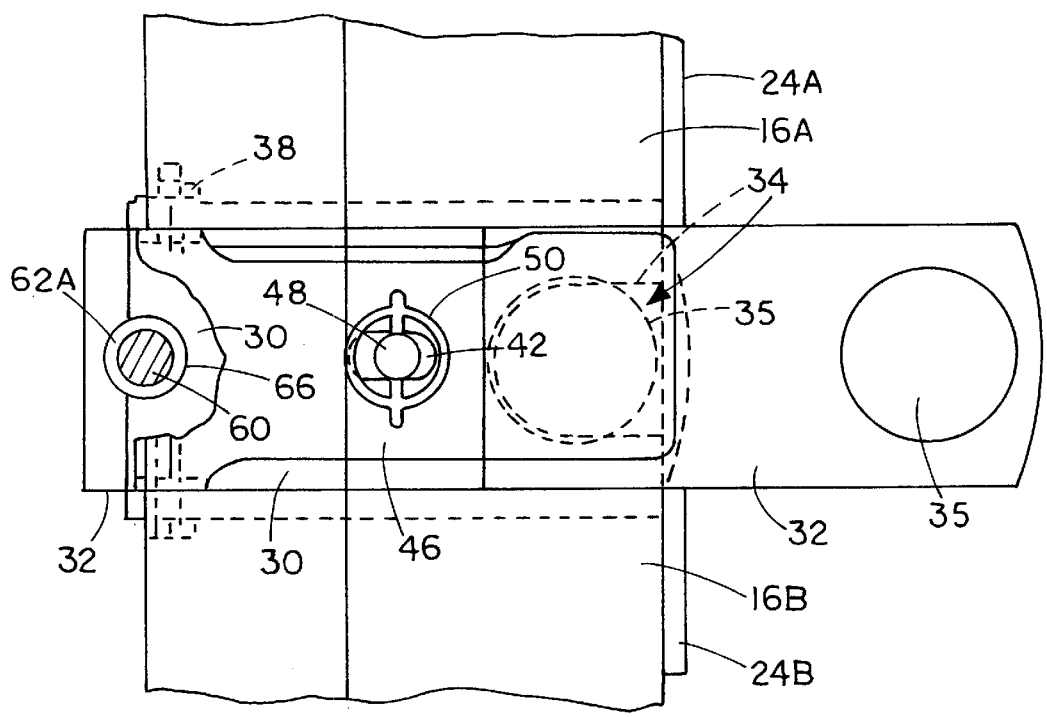
FIG. 4 is a top plan view, with parts broken away.

A guide and load plate 30 is mounted between the side plate 16A and 16B and extends partially forward from the rear side, as shown in FIG. 3, and defines a space relative to the upper surface of the bottom plate 18 in which a hitch bar 32 is slidably mounted. The hitch bar 32 extends rearwardly, as can be seen and has a standard hitch ball 35 at an outer end thereof mounted in a suitable aperture. The hitch bar is a heavy rectangular cross section bar that is guided between the latch plate 30 and the bottom plate 18, for sliding movement between a solid line position shown in FIG. 3 and its dotted line position shown in the same figure.

A latch lever 34 has a pair of depending ears 36 at the inner end thereof, and it is pivotally mounted on a suitable pivot bolt or pivot pin 38 between the side plate 16A and 16B. As can be seen, the lever is bent into a gentle "UU" shape, with a lower center portion shown at 40. This center portion 40 has a slot 42 that extends in fore and aft direction and then has a tongue portion 44 that extends out to just adjacent the outer sides of the flanges 24A and 24B. It can be formed as shown at 44A so that it will provide an edge 44B that will ride against the hitch ball 34 when the hitch ball is in its dotted line position shown in FIG. 2, and the latch lever 34 is raised upwardly so that the hitch ball can fit underneath the edge 44B.

Figure 5:
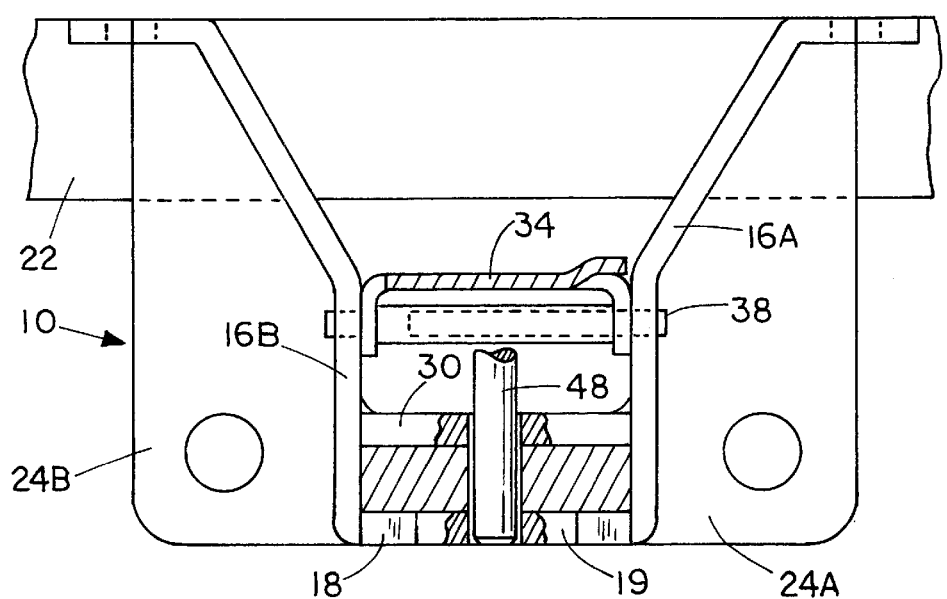
FIG. 5 is a rear view of the hitch frame.

The lever is loaded with a spring 46, that is carried over a pin 48. The pin 48 has a cross pin 50 against which the spring 46 bears, and the cross pin 50 rests on the top of the lever. The pin 48 extends through the slot 42, and through a guide opening in the latch plate 30. The upper end of the pin is guided in a bracket 52 that has a lower leg 54 that guides the pin 48, and the end of the pin 48 is spaced from an upper leg 56 of the bracket 52 so that when the lever is raised, the pin 50 will compress the spring 46 and the pin 48 will slide upwardly sufficiently above the plane of the hitch bar 32 when the hitch ball is underneath the lever and in its dotted line position in FIG. 3. This will withdraw the end of the pin 48 out of the hitch bar, and when the hitch bar is in its working position as shown in FIGS. 3 and 5 in solid lines, the pin extends through an opening in the hitch bar to hold it securely in its extended position. The rear end of the hitch bar 32 has an opening that carries a bolt 60. The bolt 60 has its head spaced from the upper side of the hitch bar with a spacer tube 62A and the lower end of the bolt 60 also carries a spacer 62B that is held in place with the nut 64. This assembly of the tubular spacers 62A and 62B and bolt 60 is used for loading. The bolt 60 is carried with the hitch bar 32, and when the hitch bar is extended, the spacers 62A and 62B fit into a notch 66 in the latch plate 30 and a notch 68 in the bottom plate 18. These notches are U-shaped, and are aligned so that the load tending to cause the hitch bar to move rearwardly, such as a load from a trailer, will cause the spacer 62A and 62B to seat in the notches and carry the towing load of the trailer. The pin 48 will hold the hitch bar from retracting, when it is in its extended position for towing.

Figure 2:
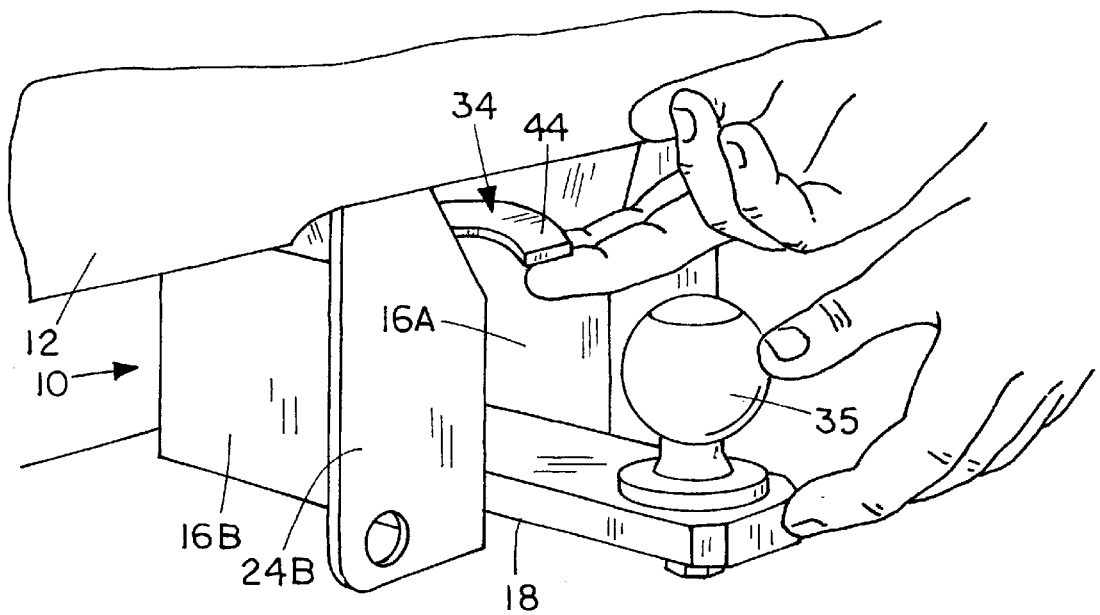
FIG. 2 is a perspective view from an opposite side of FIG. 1 illustrating the procedure in retracting the hitch into the hitch frame.

When the hitch bar is to be retracted, the lever is lifted, as shown in FIG. 2, with one hand, and the other hand then will slide the hitch bar 32 rearwardly in the housing and the hitch ball will slide under the edge 44B at the end 44, and the spring 46 will spring-load the lever and down against the hitch ball to retain it in its retracted position. The pin 48 will be lifted sufficiently to clear the hitch bar, but will remain in its aperture in the guide bar 30, and the hitch bar 32 will be maintained in a retracted position. Not only that, the spring 48 exerts a load through the lever 40 that keeps the hitch bar 32, and the hitch ball 35 pressed down against the lower wall 18, and other supporting walls, so that it will not rattle as the vehicle moves. The bottom plate 18 has a notch 19 at its edge to provide clearance for the nut holding the hitch ball.

The sliding hitch bar is used easily, in this manner, and when it is desired to retrieve the hitch bar 32, the end of the lever 34 shown at 44 is lifted sufficiently to clear the hitch ball 35, and the hitch bar is pulled out so that the hitch bar slides through the passageway that is formed between the bottom wall 18 and the wall 30, until the spacers 62A and 62B seat in the notches 66 and 68, and at that time the pin 48 will snap into place through the aperture in the hitch bar aligned with the pin 48 when the hitch bar is extended. The pin 48 will merely ride against the upper surface of the hitch bar, once the hitch ball clears the end of the lever, until it snaps into the opening that is provided for retaining it in place.

The hitch thus fulfills the requirements of providing a retractable hitch bar that is out of the way when it is not in use, and can be easily pulled out to a working position for hitching to a trailer.

Additionally it is retained in place with a separate spring-loaded lever that also aids in holding the unit from rattling.

Although the present invention has been described with reference to preferred embodiments, workers skilled in the art will recognize that changes may be made in form and detail without departing from the spirit and scope of the invention.

What is claimed is:

1. A hitch assembly for a vehicle for attaching a towed vehicle, comprising a housing, a hitch bar slidably mounted in said housing, said hitch bar being guided between a pair of plates between a retracted position where it is within the housing to a working position wherein an end of the hitch bar extends out of the housing for attaching to a vehicle, a load pin carried by the hitch bar at an inner end thereof, opposite from the end to which a towed vehicle is attached, said guides having recesses for receiving the load pin and providing reaction for carrying loads of a towed vehicle through the load pin, and a spring-loaded lever in the housing, urged in a direction toward the hitch bar, said lever being movable in an opposite direction from the hitch bar to receive a portion of the hitch bar when the hitch bar is retracted, to hold the hitch bar in its retracted position under the spring load.

2. The hitch assembly of claim 1, wherein said housing includes a pair of side plates, and a bottom plate joining said side plates, said bottom plate forming one of the guide plates, and the second guide plate being spaced from the bottom plate sufficiently to receive the hitch bar between the second guide plate and the bottom plate, the guide plate being fixed to the side walls of the housing.

3. The hitch assembly of claim 1, wherein said hitch bar carries a hitch ball for towing a vehicle, said lever receiving and spring-loading against said hitch ball when the hitch bar is retracted.

4. The hitch assembly of claim 3, wherein said lever is pivotally mounted about an axis toward the rear of the housing, and is positioned between the side plates of the housing.

5. The hitch assembly of claim 4, wherein a spring-loaded pin passes through the lever, a retainer pin on the spring-loaded pin to engage the lever on a side opposite from the hitch bar, said spring loaded pin being aligned with the hitch bar and fitting into an opening in the hitch bar under the spring load when the hitch bar is in its working position.

6. The hitch assembly of claim 5, wherein said retainer pin lifts the first pin out of the opening in the hitch bar when the lever is moved to a position to clear the hitch ball.

7. The hitch assembly of claim 2, wherein said side plates are supported on a cross bar that is attachable to a vehicle.

8. The hitch assembly of claim 6, wherein said hitch ball, and said lever are both completely within the housing when the hitch bar is in its retracted position.

9. A hitch assembly having a sliding hitch bar movable between a working position and a retracted position, said hitch bar carrying a hitch ball at an outer end thereof, and the hitch assembly having a lever pivotally mounted about a generally horizontal axis, a spring urging said lever toward the hitch bar, and said lever being movable about its axis away from the hitch bar sufficiently to receive the hitch ball when the hitch bar is retracted into the hitch.

10. The hitch assembly of claim 9, wherein said hitch bar is slidably mounted between a pair of plates, and said hitch bar carrying a load pin that moves rearwardly away from said pair of plates when the hitch is retracted, and a load pin engaging surfaces on the pair of plates to carry the load from a towed vehicle when the hitch bar is in its working position.

11. The hitch assembly of claim 9, wherein said lever is formed to have a gentle U-shape opening upwardly, a pin passing through said lever, a spring mounted on the pin and positioned to engage an upper side of said lever, and to react against a bracket on a hitch frame, the outer end of said lever inclining upwardly, and having a formed end that fits over an upper surface of the hitch ball with the hitch bar in its retracted position.

12. The hitch assembly of claim 11, wherein said pin is guided in a bracket and has an axis that aligns with openings in the plates that guide the hitch bar, the hitch bar having an opening that aligns with the openings in the plate that guide the hitch bar when the hitch bar is in its working position, said pin being urged through the openings in the guide plates and the hitch bar when the hitch bar is in its working position.

* * * * *